US012781427B2

(12) United States Patent
Scott et al.

(10) Patent No.: US 12,781,427 B2
(45) Date of Patent: Nov. 3, 2026

(54) COMPOSITIONS AND METHODS FOR THE REDUCTION OF ENVIRONMENTAL ODORS ON AND WITHIN A TEXTILE MATERIAL

(71) Applicant: MICROBAN PRODUCTS COMPANY, Huntersville, NC (US)

(72) Inventors: Ryan Scott, Charlotte, NC (US); Hannah Cooper, Charlotte, NC (US); James Clayton, Denver, NC (US)

(73) Assignee: Microban Products Company, Huntersville, NC (US)

( * ) Notice: Subject to any disclaimer, the term of this patent is extended or adjusted under 35 U.S.C. 154(b) by 0 days.

(21) Appl. No.: 19/395,680

(22) Filed: Nov. 20, 2025

(65) Prior Publication Data

US 2026/0139431 A1 May 21, 2026

Related U.S. Application Data

(60) Provisional application No. 63/722,782, filed on Nov. 20, 2024.

(51) Int. Cl.

| | |
|---|---|
| ***D06M 13/00*** | (2006.01) |
| ***C11D 1/72*** | (2006.01) |
| ***C11D 3/37*** | (2006.01) |
| ***C11D 9/00*** | (2006.01) |
| ***C11D 17/00*** | (2006.01) |
| ***D06M 13/188*** | (2006.01) |
| ***D06M 101/06*** | (2006.01) |
| ***D06M 101/32*** | (2006.01) |
| ***D06M 101/34*** | (2006.01) |

(52) U.S. Cl.

CPC ............. *D06M 13/188* (2013.01); *C11D 1/72* (2013.01); *C11D 3/3765* (2013.01); *C11D 9/007* (2013.01); *C11D 17/0017* (2013.01); *D06M 13/005* (2013.01); *D06M 2101/06* (2013.01); *D06M 2101/32* (2013.01); *D06M 2101/34* (2013.01); *D06M 2200/12* (2013.01); *D06M 2200/50* (2013.01)

(58) Field of Classification Search

CPC ............. D06M 13/005; D06M 13/188; D06M 2101/06; D06M 2101/32; D06M 2101/34; D06M 2200/12; C11D 9/007

See application file for complete search history.

(56) References Cited

U.S. PATENT DOCUMENTS

| | | | | |
|---|---|---|---|---|
| 6,083,602 | A * | 7/2000 | Caldwell | A61L 15/26 604/385.01 |
| 2003/0007945 | A1 | 1/2003 | Arif | |
| 2003/0199402 | A1 | 10/2003 | Triplett | |
| 2005/0106192 | A1 | 5/2005 | Parekh | |
| 2017/0360668 | A1 * | 12/2017 | Brossat | A61K 8/492 |
| 2021/0198840 | A1 | 7/2021 | Wheless et al. | |
| 2021/0238513 | A1 | 8/2021 | Sivik et al. | |
| 2021/0261882 | A1 | 8/2021 | Alwattari et al. | |
| 2021/0353814 | A1 | 11/2021 | Fields et al. | |
| 2023/0407209 | A1 | 12/2023 | Reese et al. | |
| 2024/0084219 | A1 * | 3/2024 | Boardman | C11D 3/50 |
| 2024/0191156 | A1 | 6/2024 | Sivik et al. | |
| 2024/0410107 | A1 | 12/2024 | Bates | |

FOREIGN PATENT DOCUMENTS

| | | | |
|---|---|---|---|
| WO | 2002010323 | A1 | 2/2002 |
| WO | 2005081811 | A2 | 9/2005 |
| WO | 2023220097 | A1 | 11/2023 |
| WO | 2024254433 | A1 | 12/2024 |

OTHER PUBLICATIONS

Morris et al., "Nonvolatile, semivolatile, or volatile: Redefining volatile for volatile organic compounds", Journal of the Air & Waste Management Association, 64:6, 661-669, 2014. (Year: 2014).*

Stafiej;. "Biocide-Free Textile Odor Management DTNW-Mitteilung" Deutschen Textilforschungszentrum Nord-West. Retrieved From The Internet On Jan. 20, 2026: <https ://www .researchgate. net/profile/Piotr-Stafiej/pu blication/3 39140421_DTNW-Mi t teilung_I 16_-_Biocide-Free_ Textile_ Odor_Management/links/5e41 0bcb4585 I 5072d8ddc 11/DTNW-Mitteilung-116-Biocide-Free-Textile-Odor-Management.pdf>. Feb. 2020 ; Cited in PCT/US2025/056381; provided herein per MPEP 609.04(a)III.

International Search Report and Written Opinion issued in PCT/US2025/056381 on Feb. 3, 2026. (12 Pages) Provided herein per MPEP 609.04(a)III.

Written Opinion and Search Report for NL App No. NL2039405, Issued on Nov. 8, 2025 (10 Pages).

Dowsiltm IE-9100 Emulsion Technical Data Sheet, Accessed Nov. 2025.

Dowsil IE-9100 Emulsion Safety Data Sheet, Accessed Nov. 2025.

Evosoft HSP Technical Data Sheet, Accessed Nov. 2025.

Flexiwet NR-50 Safety Data Sheet, Accessed Nov. 2025.

Hycar FF 26916 Product Data Sheet, Accessed Nov. 2024.

Printol NFB Mod, Product Information Auxiliaries, Accessed Nov. 2024.

Unidyne XF-5005, Safety Data Sheet, Accessed Nov. 2025.

BYK-1679 Safety Data Sheet, Accessed Nov. 2025.

Unidyne XF-5005, Technical Data Sheet, Accessed Nov. 2025.

Flexisorb OD-500 Safety Data Sheet, Accessed Nov. 2025.

Flexisorb OD-500 Technical Data Sheet, Accessed Nov. 2025.

Restriction Requirement Issued in U.S. Appl. No. 19/395,611 on Mar. 23, 2026 (11 Pages); Provided Herein Per MPEP 609. 04(a)(III).

International Search Report and Written Opinion for PCT/US2025/056385 dated Feb. 12, 2026 (8 Pages).

* cited by examiner

*Primary Examiner* — Jianfeng Song

(74) *Attorney, Agent, or Firm* — Jason A. Smith; Shumaker, Looop & Kendrick, LLP

(57) ABSTRACT

A textile treatment composition for reducing environmental odors on textile material, a treated article having the textile treatment composition applied thereon, and a method of reducing environmental odors on a textile material is provided. The textile treatment composition includes a ricinoleate salt at effective concentrations to reduce environmental odors, such as smoke, on textile materials.

1 Claim, No Drawings

COMPOSITIONS AND METHODS FOR THE REDUCTION OF ENVIRONMENTAL ODORS ON AND WITHIN A TEXTILE MATERIAL

TECHNICAL FIELD

The present invention relates generally to the field of textile odor control, and more particularly, to textile treatment compositions for the neutralization and reduction of environmental odors, such as smoke, on and within a textile material.

BACKGROUND

Smoke, whether from a bonfire or from cigarettes, is a complex mixture of compounds that has a pungent and unpleasant odor. This odor is very difficult to eliminate from textile materials via laundering and can reduce the lifespan of the affected textile materials. The smoke odor stored in the textile material emanates from the material. The emanating smoke-odor can cause embarrassment for the wearer. Additionally, if the wearer were hunting, any emanating smoke-odor could deter wildlife leading to counterproductive results and/or objectives.

SUMMARY

Accordingly, there is a need to reduce and/or neutralize environmental odors, such as smoke odors, from textile materials. The disclosed textile treatment compositions and coatings reduce and/or neutralize environmental odors, e.g. smoke odors, on textile materials.

In one aspect, a textile treatment composition for reducing environmental odors on textile material is disclosed. The textile treatment composition comprising: a ricinoleate salt, a surfactant, and water. The textile treatment composition reduces volatile isovaleric acid on a treated textile by 72% or greater.

In certain aspects, the textile treatment composition comprises from 5 weight percent to 12.5 weight percent of the ricinoleate salt, more preferably 7 weight percent to 10 weight percent, and most preferably from 8 weight percent to 9.5 weight percent.

In certain aspects, the textile treatment composition comprises from 2.5 weight percent to 7.5 weight percent of the surfactant, more preferably 3 weight percent to 7 weight percent, and most preferably from 4 weight percent to 6 weight percent.

In certain aspects, the textile treatment composition is an emulsion. In certain aspects, the textile treatment composition is preferably an oil-in-water emulsion.

In another aspect, a textile treatment bath is disclosed. The textile treatment bath comprises water and from 0.25 weight percent to 20 weight percent any of the textile treatment compositions described above. In this aspect, the textile treatment bath reduces volatile isovaleric acid on a treated textile by 72% or greater.

In certain aspects, the textile treatment bath may comprise ricinoleate salt from 0.0125 weight percent to 2.5 weight percent, more preferably from 0.025 weight % to 1.5 weight %, and most preferably from 0.5 weight % to 1.25 weight %.

In certain aspects, the textile treatment bath further comprises a durable water-repellent composition.

In another aspect, a textile article treated with the textile treatment composition is disclosed. The textile article comprising a textile material having a textile treatment composition applied thereon. In certain aspects, the treated textile article comprise from 0.25 weight percent to 20 weight percent of the textile coating composition applied thereon.

In certain aspects, the textile material comprises synthetic fiber or yarn, an organic fiber or yarn, or a combination thereof such as a hybrid fiber or hybrid yarn; and/or a woven material, a non-woven material, or a combination thereof; and/or a fabric such as a one-way stretch fabric, a two-way stretch fabric, and/or a universal stretch fabric; and/or comprises polyester, cotton, nylon (for example, nylon 6 and/or nylon 6,6), rayon, aramids, para-aramids, or a combination thereof.

In certain aspects, the textile article comprises a ricinoleate salt from 0.0125 weight % to 2.5 weight %, more preferably from 0.0125 weight % to 1.25 weight %, and most preferably from 0.25 weight % to 0.5 weight % based on the total weight of the textile material In certain aspects, the textile article comprises a durable water-repellent applied thereon.

In certain aspects, the treated textile comprises odor-capture sites that reversibly bind malodor molecules. In certain aspects, the odor-capture sites are regenerated via laundering.

In another aspect, a method of reducing environmental odor on a textile material is disclosed. The method comprising: (a) applying the textile treatment composition to a textile material, and (b) forming a treated textile article having a coating applied thereon, wherein the treated textile article neutralizes environmental odors.

In certain aspects, applying the textile treatment composition comprises exhausting.

In certain aspects, applying the textile treatment composition comprises padding.

In certain aspects, applying the textile treatment composition comprises spraying.

In certain aspects, the method further comprises, prior to step (a) diluting the textile treatment composition to form a treatment bath. In certain aspects, a durable water-repellent is added to the treatment bath. In certain aspects, the method further comprises an additional application step applying a durable water-repellent composition to the textile.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

The term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

"Owf" or percent on weight of fabric is generally used in the field and batch processes, the amount of chemical finish to be applied is usually expressed as a weight percentage based on the original fabric weight. This relationship is abbreviated as % owf (percent on weight of fabric), which is % OWF=[(Weight of Chemical/Weight of Fabric)*100]/Wet pickup rate %. For example, if a chemical is to be applied at 3% owf to 400 kg of fabric, having a wet pickup rate=80%, then 15 kg of the chemical will be used (3% of 400 kg at 80% pickup).

Textile Treatment Compositions and Textile Coatings for Reducing Environmental Odors Disclosed herein are textile treatment compositions and textile coatings that are provided in the form of a concentrate (prior to application) and applied to a textile material for reducing, binding, and/or neutralizing environmental odors, such as smoke, on and within the textile material for a prolonged period of time (e.g. 10 home launderings, 25 home laundering cycles, several months, or up to a year). The composition may be an emulsion. Preferably the composition is an oil-in-water emulsion.

In particular, a first textile treatment composition may comprise: ricinoleate salts and an acrylate binder. The first textile treatment compositions may further include water, a surfactant, and a defoamer. The odor control concentrate compositions are liquids at ambient conditions, and are more preferably an emulsion (e.g., water in oil emulsion or oil in water emulsion depending on water and oil content of the particular concentrate composition).

The ricinoleate salt may be zinc ricinoleate. The ricinoleate salt may be other divalent ricinoleate salts such as magnesium ricinoleate or calcium ricinoleate. Alternatively, the ricinoleate salt may be a monovalent ricinoleate salt such as sodium ricinoleate or potassium ricinoleate. In certain aspects, the ricinoleate salt used herein is a 50 weight percent zinc ricinolate dispersion (Technical Data Sheet, FLEXISORB™ OD-500, incorporated herein by reference).

Acrylate binders may be used in the textile coating composition to provide wash durability and prolonged anti-odor properties. Examples of acrylate binders include, but are not limited to: Printol HFB, sourced from DYSTAR®, an acrylate copolymer (Product Data Sheet, issue date 05/2008) and HYCAR® FF 26916, a formaldehyde and APE-free acrylic emulsion polymer having 48.5-21.0 weight % solids, 30-300 cps viscosity, pH 8.0-9.0, Tg+2° C. (Product Data Sheet, Lubrizol, accessed November 2024).

The surfactant in the first textile treatment composition is preferably a non-ionic surfactant, which provides stability across pH, salt, and temperature variations. The surfactant preferably has an HLB value between about 12 to about 15. The surfactant promotes emulsion stability by reducing interfacial tension between oil and water. The surfactant preferably has a hydrophobic segment and a hydrophilic segment; the hydrophobic segment anchors the oil droplet while the hydrophilic segment extends into the water, forming a stabilizing layer that prevents droplets from merging.

The surfactant may be an ethoxylated ester, an alkylphenol ester, and/or a polyglycerol ester. The surfactant in the textile treatment composition may comprise PEG-40 hydrogenated castor oil (CAS No: 61788-85-0) (Tradename: ETHOXCARE® HCO40), polyglyceryl-4 Oleate (CAS No.: 71012-10-7), octylphenoxy poly(ethyleneoxy) ethanol (CAS No.: 9002-93-1) (Tradename: IGEPAL® CA-630), t-octylphenoxypolyethoxyethanol (CAS No.: 9036-19-5) (Tradename: TRITON™ X-100), Polyethylene glycol sorbitan monooleate (Polysorbate 80) (CAS No.: 9005-65-6) (Tradename: TWEEN® 80), Polyethylene glycol sorbitan monolaurate (CAS No.: 9005-64-5) (Tradename: TWEEN® 20), castor oil ethoxylate (CAS No.: 61791-12-6) (Tradename: TERGITOL® ECO-36), PEG-16 hydrogenated castor oil (CAS No.: 61791-12-6) (Tradename: ETHOXCARE® HCO-16), PEG-25 hydrogenated castor oil (CAS No.: 61788-85-0) (Tradename: ETHOXCARE® HCO-25), or similar surfactants.

The defoamer may be a polydimethylsiloxane such as poly(oxy-1,2-ethanediyl), a-tridecyl-w-hydroxy-, branched (CAS No.: 69011-36-5); Poly(oxy-1,2-ethanediyl), a-octadecyl-w-hydroxy (CAS No.: 9005-00-9), dimethylpolysiloxane (CAS No.: 63148-62-9) (Tradename: XIAMETER™ AFE 1430), or a combination thereof. Other suitable defoamers may also be used in the textile coating composition.

The first textile treatment composition may comprise from 5 weight percent to 12.5 weight percent of the ricinoleate salt, more preferably 7 weight percent to 10 weight percent, and most preferably from 8 weight percent to 9.5 weight percent.

The first textile treatment composition may comprise from 1 weight percent to 15 weight percent of the surfactant, more preferably 2 weight percent to 10 weight percent, and most preferably from 3 weight percent to 7 weight percent.

The first textile treatment composition may comprise from 2.5 weight percent to 25 weight percent of the acrylate binder, more preferably from 7.5 weight percent to 20 weight percent, and most preferably from 10 weight percent to 15 weight percent.

The first textile treatment composition may comprise a ratio of ricinoleate salt to acrylate binder from 1:3 to 3:1, more preferably from 1:2.5 to 2.5:1, most preferably from 1:2 to 2:1.

In some embodiments, a second textile treatment composition comprises a ricinoleate salt and a surfactant. In this embodiment, the second textile treatment composition is configured for use in combination with a durable water repellent ("DWR"). The second textile treatment composition may be applied in combination with a DWR composition or in sequence with a DWR composition. In some aspects, the surfactant is a semi-volatile surfactant (e.g., isopropanolamine lauryl sulfate, alcohol ethoxylates (C9-C11EO5-7), fluorosurfactant with volatile counter-ion (e.g., ammonium perfluorohexyl sulfonate), 2-butoxyethanol+ nonionic surfactant blends (e.g., AE-9), and trisiloxane polyether surfactants). The semi-volatile surfactant may comprise FLEXIWET™ NR-50 (Product Data Sheet, ICT, accessed November 2025). A semi-volatile surfactant is preferred because the hydrophilic groups on the surfactant volatilize leaving the hydrophobic tail behind, thus improving compatibility with the hydrophobic repellent properties of the DWR.

DWR compositions that may be combined with the second textile treatment composition above include poly(octadecyl acrylate) (CAS 25986-77-0), a non-ionic organic-silicone hybrid emulsion (Tradename: DOWSIL™ IE 9100) (Product Data Sheet and Safety Data Sheet, DOW, accessed November 2025), a non-fluorinated cationic acrylate copolymer (Tradename: UNIDYNE XF-5005) (Product Data Sheet and Safety Data Sheet, DAIKIN, accessed November 2025).

The second textile treatment composition may comprise from 5 weight percent to 12.5 weight percent of a ricinoleate salt; more preferably 7 weight percent to 10 weight percent, and most preferably from 8 weight percent to 9.5 weight percent. The textile treatment composition may comprise from 2.5 weight percent to 7.5 weight percent of a semi-volatile surfactant, more preferably from 3 weight percent to 7 weight percent, most preferably from 4 weight percent to 6 weight percent.

Further disclosed herein are textile treatment compositions that are provided in a diluted form and ready for application to a textile material for reducing environmental odors, such as smoke, on and within the textile material. The diluted textile treatment compositions comprise from 0.25 weight percent to 20 weight percent of the textile treatment composition(s) described above and water. Additional components in the diluted textile treatment composition include textile softeners, durable water-repellents, and other additives.

In this aspect, the first diluted textile coating composition comprises additional water from 80 weight % to 99.75 weight %. The first diluted textile coating composition may comprise ricinoleate salt from 0.0125 weight % to 2.5 weight %, more preferably from 0.0125 weight % to 1.25 weight %, and most preferably from 0.25 weight % to 0.5 weight %. The first diluted textile coating composition may comprise acrylate binder from 0.00625 weight % to 5 weight %, more preferably from 0.00625 weight % to 2.5 weight %, and most preferably from 0.0125 weight % to 1 weight %. The first diluted textile coating composition may comprise surfactant from 0.0125 weight % to 3 weight %, more preferably from 0.0125 weight % to 1.5 weight %, and most preferably from 0.025 weight % to 0.6 weight %.

In this aspect, the second diluted textile coating composition comprises water from 80 weight % to 99.75 weight %. The second diluted textile coating composition may comprise ricinoleate salt from 0.0125 weight % to 2.5 weight %, more preferably from 0.0125 weight % to 1.25 weight %, and most preferably from 0.25 weight % to 0.5 weight %. The second diluted textile coating composition may comprise surfactant from 0.0125 weight % to 3 weight %, more preferably from 0.0125 weight % to 1.5 weight %, and most preferably from 0.025 weight % to 0.6 weight %.

Textile Coating for Reducing Environmental Odors on Textiles

The textile coating composition described above, when applied to a textile forms a coating that reduces environmental odors on the textile. The coating is durable and will reduce environmental odors on the textile for a prolonged period of time (e.g. 10 home launderings, 25 home laundering cycles, several months, or up to a year). The components within the textile coating are adhered on the surface of the textile due to the binder, some components will be absorbed into the amorphous regions of the textile fiber during the application process.

Treated Textile Articles for Reducing Environmental Odors

Further disclosed herein are the treated textile articles having the above mentioned textile treatment compositions and coatings applied thereon. The treated textile articles disclosed herein reduce or neutralize environmental odors, such as smoke odors, on the textile article for a prolonged period of time. The textile material may be polyester, cotton, polyethylene terephthalate, nylon, rayon, spandex, aramids, paramids, or a combination thereof. The textile material may be a woven material, a non-woven material, or a combination thereof.

The treated textile article may comprise ricinoleate salt, and an acrylate binder. The treated textile article may comprise ricinoleate salt from salt from 0.0125 weight % to 2.5 weight %, more preferably from 0.0125 weight % to 1.25 weight %, and most preferably from 0.25 weight % to 0.5 weight % based on the total weight of the textile material. The treated textile article may comprise acrylate binder from 0.00625 weight % to 5 weight %, more preferably from 0.00625 weight % to 2.5 weight %, and most preferably from 0.0125 weight % to 1 weight % based on the total weight of the textile material. The treated textile article may comprise surfactant from 0.0125 weight % to 3 weight %, more preferably from 0.0125 weight % to 1.5 weight %, and most preferably from 0.025 weight % to 0.6 weight % based on the total weight of the textile material.

In some embodiments, the treated textile article may further comprise other additives such as a textile softener. The treated textile article may comprise from 0.1 weight percent to 2 weight percent of a textile softener, more preferably from 0.25 weight percent to 1.25 weight percent, most preferably from 0.4 weight percent to 0.75 weight percent, based on the total weight of the textile material.

The treated textile article may comprise a ricinoleate salt and a durable water-repellent composition. The treated textile article may comprise ricinoleate salt from salt from 0.0125 weight % to 2.5 weight %, more preferably from 0.0125 weight % to 1.25 weight %, and most preferably from 0.25 weight % to 0.5 weight % based on the total weight of the textile material. The treated textile article may comprise ricinoleate salt from salt from 0.0125 weight % to 2.5 weight %, more preferably from 0.0125 weight % to 1.25 weight %, and most preferably from 0.25 weight % to 0.5 weight % based on the total weight of the textile material. The treated textile article may comprise from 1 weight percent to 5 weight percent of a durable water-repellent, more preferably from 1.5 weight percent to 4 weight percent, most preferably from 1 weight percent to 2.5 weight percent, based on the total weight of the textile material.

The treated textile articles, when exposed to environmental odors such as smoke, exhibit less smoke smell and less volatile compounds associated with smoke odor in comparison to untreated textile articles.

Methods of for Reducing Environmental Odors on Textile Material

The textile coating compositions are provided in the form of a concentrate. The textile coating composition concentrate may be diluted with a carrier solvent, such as water, to a desired concentration to prepare an application bath, or treatment bath. The application bath may have approximately 0.25 weight % to 20 weight % of the textile coating composition. The application bath is used in an exhaustion or padding method to treat the textile material.

For example, when using the padding or spraying method, the pad or spray bath is made by combining the concentrate of the odor control/textile coating composition and water, which is approximately 0.25 weight % to 20 weight % textile treatment composition concentrate of the composition and 80 weight % to 99.75 weight % water. The pad bath is padded onto the desired textile material and is subsequently cured/dried at 120° C. in an infrared (IR) drier for 2 minute to obtain a dry textile material that neutralizes odor and/or organic malodor molecules on the textile material for a prolonged period of time (e.g., 25 wash cycles, several months, or up to a year).

For example, in the exhausting method, the exhaustion bath is made by combining the concentrate of the odor control/textile composition and water, which is approximately 0.25 weight % to 20 weight % concentrate and 80 weight % to 99.75 weight % water. The exhaustion may be performed in a beaker dyeing machine that includes the desired textile material, e.g., Lobomat BFA-24 Werner Mathis AG. The exhaustion conditions may include the following: liquor ratio of 10:1 to 30:1, exhaustion temperature at 135° C., dwell time at the exhaustion temperature was 45 minutes, and the heating and cooling rate was 1.5° C./minute. After the exhaustion, the treated textile materials were rinsed and then cured/dried in an IR drier at 120° C. for 2 minute to obtain a dry textile material having that neutralizes odor and/or organic malodor molecules on the textile material for a prolonged period of time (e.g., 25 wash cycles, several months, or up to a year).

WORKING EXAMPLES

Example 1: A textile treatment compositions were prepared according to Table 1. The values in Table 1 are in weight percent, based on the total weight of the composition. The zinc ricinoleate used in Ex. 1 is a 50 weight percent zinc ricinolate dispersion (Technical Data Sheet, FLEXISORB™ OD-500, incorporated herein by reference). The anionic acrylic resin used in Ex. 1 is HYCAR® FF 26916, a formaldehyde and APE-free acrylic emulsion polymer having 48.5-21.0 weight % solids, 30-300 cps viscosity, pH 8.0-9.0, Tg+2° C. (Product Data Sheet, Lubrizol, accessed November 2024). The surfactant used in Ex. 1 is PEG-40 hydrogenated castor oil (CAS No: 61788-85-0) (Tradename: ETHOXCARE® HCO40). The defoamer used in Ex. 1 is BYK-1679 (a combination of poly(oxy-1,2-ethanediyl), a-tridecyl-w-hydroxy-, branched (CAS No.: 69011-36-5); and Poly(oxy-1,2-ethanediyl), a-octadecyl-w-hydroxy (CAS No.: 9005-00-9). The compositions are each prepared as an oil in water emulsion.

TABLE 1

| Component | Function | Ex. 1 (wt %) |
|---|---|---|
| Zinc Ricinoleate (CAS No: 13040-19-2) | Active | 8.3 |
| Anionic Acrylic Resin | Binder | 12.5 |
| PEG-40 Hydrogenated Castor Oil (HCO-40) (CAS No: 61788-85-0) | Surfactant | 5.0 |
| Polydimethylsiloxane | Defoamer | 0.0085 |
| Water | Dilutant | To 100% |

Volatile organic compounds or VOCs commonly associated with fire/smoke residue are measured vis mass spectroscopy. Analysis performed via ASTM method D7706-11 (modified) with reference to ASTM method D5116-10. Samples are off-gassed, under a flow of nitrogen, at 80° C. for 10 minutes. Higher values indicate greater presence of VOCs within the fabric.

Each textile material was padded with the identified owf percentage with a drying time of 90 second at 120° C. Home launderings (HL) were performed according to AATCC LP1. The textile materials were first laundered at various intervals and dried. Next, 6"×6" pieces of fabric were mounted within a 2'×2' smoking chamber. The chamber is connected to a cocktail smoker. 0.2 g of Hickory wood chips were placed within smoker apparatus. Wood chips were ignited using a butane torch until combustion could no longer be observed (~5 seconds). The fabric sample remained in the closed smoking chamber for 60 seconds. Then, the lid to the chamber was opened, allowing the smoke to dissipate. The samples remained in the open smoking chamber for an additional 60 seconds. Samples were then removed and placed in individual bags and sent for quantitative analysis.

The treated and smoked textile material was compared with untreated smoked textile material and treated unsmoked textile material. Table 2A shows the quantitative analysis of recycled polyethylene terephthalate ("rPET") fleece (361 gsm) padded with 1.3% owf of Ex 1 prior to laundering. Table 2B shows the quantitative analysis of rPET fleece (361 gsm) padded with 1.3% owf of Ex 1 after five launderings. Table 2C shows the quantitative analysis of rPET fleece (361 gsm) padded with 1.3% owf of Ex 1 after twenty launderings. Table 2D shows the quantitative analysis of knit jersey (150 gsm) padded with 2% owf of Ex 1 prior to laundering. Table 2E shows the quantitative analysis of knit jersey (150 gsm) padded with 2% owf of Ex 1 after five launderings. Table 2F shows the quantitative analysis of knit jersey (150 gsm) padded with 2% owf of Ex 1 after twenty launderings.

TABLE 2A

| Ex. 1 applied at | Smoked | | Unsmoked | |
|---|---|---|---|---|
| 1.3% owf - Zero Launderings | Concentration (ng/g) | Reporting limit (ng/g) | Concentration (ng/g) | Reporting limit (ng/g) |
| o-Cresol | 1.2 | 1.2 | <1.1 | 1.1 |
| 2-Methoxyphenol | 5.5 | 1.2 | 4.8 | 1.1 |
| m,p-Cresol | 2.7 | 2.4 | <2.1 | 2.1 |
| Creosol | 2.1 | 1.2 | 1.3 | 1.1 |
| 4-Ethyl-2-methoxyphenol | <2.4 | 2.4 | <2.1 | 2.1 |
| Acenaphthylene | <1.2 | 1.2 | <1.1 | 1.1 |
| Acrolein | <4.7 | 4.7 | <4.2 | 4.2 |
| Acetonitrile | <2.4 | 2.4 | <2.1 | 2.1 |
| 2-Furaldehyde | 13 | 4.7 | <4.2 | 4.2 |
| Salicyladehyde | 2.1 | 1.2 | 1.5 | 1.1 |
| 2,4-Dimethylphenol | <1.2 | 1.2 | <1.1 | 1.1 |
| Naphthalene | 1.8 | 1.2 | 1.3 | 1.1 |
| 2-Methylnaphthalene | <1.2 | 1.2 | <1.1 | 1.1 |
| Biphenyl | <4.7 | 4.7 | <4.2 | 4.2 |
| Methylbiphenyl | <4.7 | 4.7 | <4.2 | 4.2 |

TABLE 2B

| | Smoked | | Unsmoked | |
|---|---|---|---|---|
| Ex. 1 applied at 1.3% owf - Five Launderings | Concentration (ng/g) | Reporting limit (ng/g) | Concentration (ng/g) | Reporting limit (ng/g) |
| o-Cresol | <1.2 | 1.2 | <1.3 | 1.3 |
| 2-Methoxyphenol | 4.8 | 1.2 | 4.1 | 1.3 |
| m,p-Cresol | 2.4 | 2.3 | <2.6 | 2.6 |
| Creosol | 2.5 | 1.2 | 1.4 | 1.3 |
| 4-Ethyl-2-methoxyphenol | <2.3 | 2.3 | <2.6 | 2.6 |
| Acenaphthylene | <1.2 | 1.2 | <1.3 | 1.3 |
| Acrolein | <4.7 | 4.7 | <5.2 | 5.2 |
| Acetonitrile | <2.3 | 2.3 | <2.6 | 2.6 |
| 2-Furaldehyde | 26 | 4.7 | <5.2 | 5.2 |
| Salicyladehyde | 1.6 | 1.2 | 1.4 | 1.3 |
| 2,4-Dimethylphenol | <1.2 | 1.2 | <1.3 | 1.3 |
| Naphthalene | 1.2 | 1.2 | 1.3 | 1.3 |
| 2-Methylnaphthalene | <1.2 | 1.2 | <1.3 | 1.3 |
| Biphenyl | <4.7 | 4.7 | <5.2 | 5.2 |
| Methylbiphenyl | <4.7 | 4.7 | <5.2 | 5.2 |

TABLE 2C

| | Smoked | | Unsmoked | |
|---|---|---|---|---|
| Ex. 1 applied at 1.3% owf - Twenty Launderings | Concentration (ng/g) | Reporting limit (ng/g) | Concentration (ng/g) | Reporting limit (ng/g) |
| o-Cresol | <1.3 | 1.3 | <1.3 | 1.3 |
| 2-Methoxyphenol | 4.4 | 1.3 | 3.8 | 1.3 |
| m,p-Cresol | <2.6 | 2.6 | <2.7 | 2.7 |
| Creosol | 2.2 | 1.3 | 1.4 | 1.3 |
| 4-Ethyl-2-methoxyphenol | <2.6 | 2.6 | <2.7 | 2.7 |
| Acenaphthylene | <1.3 | 1.3 | <1.3 | 1.3 |
| Acrolein | <5.2 | 1.3 | <5.4 | 5.4 |
| Acetonitrile | <2.6 | 1.3 | <2.7 | 2.7 |
| 2-Furaldehyde | 13 | 5.2 | <5.4 | 5.4 |
| Salicyladehyde | 2 | 1.3 | 1.6 | 1.3 |
| 2,4-Dimethylphenol | <1.3 | 1.3 | <1.3 | 1.3 |
| Naphthalene | <1.3 | 1..3 | <1.3 | 1.3 |
| 2-Methylnaphthalene | <1.3 | 1.3 | <1.3 | 1.3 |
| Biphenyl | <5.2 | 5.2 | <5.4 | 5.4 |
| Methylbiphenyl | <5.2 | 5.2 | <5.4 | 5.4 |

TABLE 2D

| | Smoked | | Unsmoked | |
|---|---|---|---|---|
| Ex. 1 applied at 2% owf - Zero Launderings | Concentration (ng/g) | Reporting limit (ng/g) | Concentration (ng/g) | Reporting limit (ng/g) |
| o-Cresol | 3.9 | 3.1 | 3.2 | 3.2 |
| 2-Methoxyphenol | 10 | 3.1 | 6.5 | 3.2 |
| m,p-Cresol | 10 | 6.2 | <6.5 | 6.5 |
| Creosol | 4 | 3.1 | <3.2 | 3.2 |
| 4-Ethyl-2-methoxyphenol | <6.2 | 6..2 | <6.5 | 6.5 |
| Acenaphthylene | <3.1 | 3.1 | <3.2 | 3.2 |
| Acrolein | <12 | 12 | <13 | 13 |
| Acetonitrile | <6.2 | 6.2 | <6.5 | 6.5 |
| 2-Furaldehyde | 31 | 12 | <13 | 13 |
| Salicyladehyde | 4.7 | 3.1 | 4.5 | 3.2 |
| 2,4-Dimethylphenol | <3.1 | 3.1 | <3.2 | 3.2 |
| Naphthalene | 20 | 3.1 | 12 | 3.2 |
| 2-Methylnaphthalene | <3.1 | 3.1 | <3.2 | 3.2 |
| Biphenyl | 190 | 12 | 89 | 13 |
| Methylbiphenyl | <12 | 12 | <13 | 13 |

TABLE 2E

| | Smoked | | Unsmoked | |
|---|---|---|---|---|
| Ex. 1 applied at 2% owf - Five Launderings | Concentration (ng/g) | Reporting limit (ng/g) | Concentration (ng/g) | Reporting limit (ng/g) |
| o-Cresol | 4.1 | 3.5 | <3.3 | 3.3 |
| 2-Methoxyphenol | 10 | 3.5 | 5.5 | 3.3 |
| m,p-Cresol | 13 | 6.9 | <6.6 | 6.6 |
| Creosol | 5.5 | 3.5 | <3.3 | 3.3 |
| 4-Ethyl-2-methoxyphenol | <6.9 | 6.9 | <6.6 | 6.6 |
| Acenaphthylene | <3.5 | 3.5 | <3.3 | 3.3 |
| Acrolein | <14 | 14 | <13 | 13 |
| Acetonitrile | <6.9 | 6.9 | <6.6 | 6.6 |
| 2-Furaldehyde | 83 | 14 | <13 | 13 |
| Salicyladehyde | 4.3 | 3.5 | 3.5 | 3.3 |
| 2,4-Dimethylphenol | <3.5 | 3.5 | <3.3 | 3.3 |
| Naphthalene | 9 | 3.5 | 4.5 | 3.3 |
| 2-Methylnaphthalene | <3.5 | 3.5 | <3.3 | 3.3 |
| Biphenyl | 68 | 14 | 30 | 13 |
| Methylbiphenyl | <14 | 14 | <13 | 13 |

TABLE 2F

| | Smoked | | Unsmoked | |
|---|---|---|---|---|
| Ex. 1 applied at 2% owf - Twenty Launderings | Concentration (ng/g) | Reporting limit (ng/g) | Concentration (ng/g) | Reporting limit (ng/g) |
| o-Cresol | <3 | 3 | <3.1 | 3.1 |
| 2-Methoxyphenol | 5.7 | 3 | 5.3 | 3.1 |
| m,p-Cresol | 7.8 | 6 | <6.3 | 6.3 |
| Creosol | 4 | 3 | <3.1 | 3.1 |
| 4-Ethyl-2-methoxyphenol | <6 | 6 | <6.3 | 6.3 |
| Acenaphthylene | <3 | 3 | <3.1 | 3.1 |
| Acrolein | <12 | 12 | <13 | 13 |
| Acetonitrile | <6 | 6 | <6.3 | 6.3 |
| 2-Furaldehyde | 53 | 12 | <13 | 13 |
| Salicyladehyde | 3.5 | 3 | 3.6 | 3.1 |
| 2,4-Dimethylphenol | <3 | 3 | <3.1 | 3.1 |
| Naphthalene | 4.6 | 3 | 4.3 | 3.1 |
| 2-Methylnaphthalene | <3 | 3 | <3.1 | 3.1 |
| Biphenyl | 28 | 12 | 25 | 13 |
| Methylbiphenyl | <12 | 12 | <13 | 13 |

Treated textile materials consistently showed higher levels of VOC off-gassing. This indicates that the treatment captures the VOCs beyond the capability demonstrated by the fabric itself. The off-gassing test method forces the captured VOCs out of the fabric. The difference of VOCs detected after smoking of the treated and untreated fabrics demonstrates efficacy on multiple substrates and confirms efficacy of the textile treatment compositions and the treated textiles after laundering.

The composition in Ex. 1 was applied to various textile material via padding or exhaustion, as shown in Tables 3A-3E. The determination of deodorant property was measured using ISO17299 to measure isovaleric acid odor reduction. Isovaleric acid odor was reduced on the textile both before and after laundering, further indicating the durability of the textile treatment. Table 3B illustrates that the addition of a textile softener, EVOSOFT™ HSP (hydrophilic micro silicone emulsion softener; pH 4-6; weakly cationic (Dystar Co.) does not alter the durable odor reduction properties of the textile treatment composition. Further, the odor reduction properties are illustrated over a broad range of doses from 0.5% owf to 7.5% owf.

TABLE 3A

| Ex. 1 Dosage | 0.5% | 0.5% | 1.3% | 1.3% |
|---|---|---|---|---|
| Textile Material | PET | PET | Fleece 100% rPET | Fleece 100% rPET |
| Application Method | Padding | Padding | Padding | Padding |
| No. of Launderings | 0 | 20 | 0 | 20 |
| | — | — | — | — |
| Zinc Ricinoleate (CAS No: 13040-19-2) % owf | 0.04% | 0.04% | 0.11% | 0.11% |
| Anionic Acrylic Resin % owf | 0.05% | 0.05% | 0.13% | 0.13% |
| IVA Reduction | 82% | 82% | 93% | 89% |

TABLE 3B

| Ex. 1 Dosage | 2% | 2% | 2% | 2% |
|---|---|---|---|---|
| Textile Material | Knit 100% rPET | Knit 100% rPET | UA Woven 92% rPET/8% SPX | UA Woven 92% rPET/8% SPX |
| Application Method | Padding | Padding | Padding | Padding |
| No. of Launderings | 0 | 20 | 0 | 20 |
| Additive | — | — | 0.50% owf EvoSoft HSP | 0.50% owf EvoSoft HSP |
| Zinc Ricinoleate (CAS No: 13040-19-2) % owf | 0.17% | 0.17% | 0.17% | 0.17% |
| Anionic Acrylic Resin % owf | 0.20% | 0.20% | 0.20% | 0.20% |
| IVA Reduction | 85% | 72% | 98% | 99% |

TABLE 3C

| Ex. 1 Dosage | 7.5% | 7.5% | 7.5% | 7.5% |
|---|---|---|---|---|
| Textile Material | 100% Cotton | 100% Cotton | 50% Cotton/ 50% PET | 50% Cotton/ 50% PET |
| Application Method | Exhaustion | Exhaustion | Exhaustion | Exhaustion |
| No. of Launderings | 0 | 20 | 0 | 20 |
| Zinc Ricinoleate (CAS No: 13040-19-2) % owf | 10.4% | 10.4% | 10.4% | 10.4% |
| Anionic Acrylic Resin % owf | 15.6% | 15.6% | 15.6% | 15.6% |
| IVA Reduction | 100% | 99% | 99% | 99% |

TABLE 3D

| Ex. 1 Dosage | 7.5% | 7.5% | 0.75% | 0.75% |
|---|---|---|---|---|
| Textile Material | 90% Cotton/ 10% PET | 90% Cotton/ 10% PET | 50% Cotton/ 50% PETSock | 50% Cotton/ 50% PETSock |
| Application Method | Exhaustion | Exhaustion | Exhaustion | Exhaustion |
| No. of Launderings | 0 | 20 | 0 | 20 |
| Zinc Ricinoleate (CAS No: 13040-19-2) % owf | 10.4% | 10.4% | 1.0% | 1.0% |

TABLE 3D-continued

| Ex. 1 Dosage | 7.5% | 7.5% | 0.75% | 0.75% |
|---|---|---|---|---|
| Anionic Acrylic Resin % owf | 15.6% | 15.6% | 1.6% | 1.6% |
| IVA Reduction | 100% | 99% | 99% | 100% |

TABLE 3E

| Ex. 1 Dosage | 0.75% | 0.75% | 0.50% | 0.50% |
|---|---|---|---|---|
| Textile Material | 84% Cotton/ 16% PETSock | 84% Cotton/ 16% PETSock | PET/SPX (82/8) | PET/SPX (82/8) |
| Application Method | Exhaustion | Exhaustion | Exhaustion | Exhaustion |
| No. of Launderings | 0 | 20 | 0 | 20 |
| Zinc Ricinoleate (CAS No: 13040-19-2) % owf | 1.0% | 1.0% | 0.4% | 0.4% |
| Anionic Acrylic Resin % owf | 1.6% | 1.6% | 0.6% | 0.6% |
| IVA Reduction | 99% | 100% | 99% | 99% |

To measure m,p-methoxyphenol absorbed by the treated textiles, a textile sample is placed in a flask that is flushed with nitrogen and sealed. A known amount of odorant is added to the flask and it is re-sealed. After 2 hours, the amount of m,p-methoxyphenol in the headspace gas is measured and the result is compared to that of a flask containing no textile sample, using a GC/MS. From these experiments, the percent m,p-methoxyphenol absorbed by a particular textile material is calculated. Table 4 shows the percent of m,p-methoxyphenol absorbed by textiles that were untreated, treated with 0.25% owf of Ex. 1, 0.50% owf of Ex. 1, and 2% owf of Ex. 1, along with the amount of zinc measured on the textile as a measure of zinc ricinoleate on and within the textile material. As the on-weight-of-fabric (OWF) percentage of the textile treatment increased, odor absorption by the textile material also increased. This demonstrates the effectiveness of the treated fabric in absorbing and reducing malodor concentration in the headspace.

TABLE 4

| Ex. 1 Dosage | Average m,p-methoxyphenol absorbed | Zn (ppm) |
|---|---|---|
| 0% owf | 38% | 0 |
| 0.25% owf | 43% | 37.3 |
| 0.50% owf | 69% | 109 |
| 2% owf | 78% | 240 |

Examples 2 and Example 3: Textile treatment compositions were prepared according to Table 5. The values in Table 1 are in weight percent, based on the total weight of the composition. The zinc ricinoleate used in Ex. 1 is a 50 weight percent zinc ricinolate dispersion (Technical Data Sheet, FLEXISORB™ OD-500, incorporated herein by reference). The defoamer used in Ex. 2 and Ex. 3 is BYK-1679 (a combination of poly(oxy-1,2-ethanediyl), a-tridecyl-w-hydroxy-, branched (CAS No.: 69011-36-5); and Poly(oxy-1,2-ethanediyl), a-octadecyl-w-hydroxy (CAS No.: 9005-00-9). The surfactant used in Ex. 2 and Ex. 3 semi-volatile surfactant may comprise FLEXIWET™ NR-50. The compositions are each prepared as an oil in water emulsion.

TABLE 5

| | | Ex. 2 | Ex. 3 |
|---|---|---|---|
| Zinc Ricinoleate (CAS No: 13040-19-2) | Active | 7.5 | 10 |
| FLEXIWET ™ NR-50 | Surfactant | 2.5 | 3.34 |
| Polydimethylsiloxane aqueous dispersion | Defoamer | — | 0.017 |
| Water | Dilutant | To 100% | To 100% |

Ex. 2 and Ex. 3 were each applied to woven rPET with varying types and doses of DWRs. Table 6 illustrates that the application of a DWR does not hinder the odor absorption and odor reduction properties of the textile treatment composition. It further illustrates that the DWR maintains its water repellent properties via AATCC TM22 2019e. Tables 7 and 8 illustrate that various DWR chemistries are compatible with the textile coating composition and that the textile coating composition, as well as the DWR maintain wash durability after 20 launderings.

TABLE 6

| Ex. 2 Dosage | 2.0% | 0% |
|---|---|---|
| DWR and Dosage | poly(octadecyl acrylate) 2.5% | poly(octadecyl acrylate) 4.0% |
| Textile Material | rPET woven | rPET woven |
| Application Method | Padding | Padding |
| No. of Launderings | 0 | 0 |
| Zinc Ricinoleate (CAS No: 13040-19-2) % owf | 0.2% | 0 |
| IVA Reduction | 89% | ND |
| AATCC TM22 2019e | — | 100% |

TABLE 7

| Ex. 3 Dosage | 1.0% | 1.0% | 0% | 1.0% | 1.0% |
|---|---|---|---|---|---|
| DWR and Dosage | poly(octadecyl acrylate) 4.0% | poly(octadecyl acrylate) 4.0% | DOWSIL ™ IE 9100 1.28% | DOWSIL ™ IE 9100 1.28% | DOWSIL ™ IE 9100 1.28% |
| Textile Material | rPET woven | rPET woven | rPET woven | rPET woven | rPET woven |
| Application Method | Padding | Padding | Padding | Padding | Padding |
| No. of Launderings | 0 | 20 | 0 | 0 | 20 |
| Zinc Ricinoleate (CAS No: 13040-19-2) % owf | 0.1% | 0.1% | 0 | 0.1% | 0.1% |
| IVA Reduction | 93% | 83% | ND | ND | ND |
| AATCC TM22 2019e | 100% | 100% | 100% | 90% | 100% |

TABLE 8

| Ex. 3 Dosage | 0% | 1.0% | 1.0% |
|---|---|---|---|
| DWR and Dosage | UNIDYNE XF-5005 | UNIDYNE XF-5005 | UNIDYNE XF-5005 |
| Textile Material | rPET woven | rPET woven | rPET woven |
| Application Method | Padding | Padding | Padding |
| No. of Launderings | 0 | 0 | 20 |
| Zinc Ricinoleate (CAS No: 13040-19-2) % owf | 0 | 0.1% | 0.1% |
| IVA Reduction | ND | 79% | 80% |
| AATCC TM22 2019e | 100% | 100% | 100% |

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A liquid textile treatment composition for reducing environmental odors on a textile material and configured to be applied in combination with a durable water repellent, the composition consisting of:

(a) from 5 weight percent to 12.5 weight percent of a ricinoleate salt;

(b) from 2.5 weight percent to 7.5 weight percent of a semi-volatile surfactant selected from the group consisting of isopropanolamine lauryl sulfate, C9-C11 alcohol ethoxylate having 5-7 EO units, a fluorosurfactant with volatile counter-ion, 2-butoxyethanol and nonionic surfactant blends, trisiloxane polyether, and combinations thereof;

(c) water; and (d) optionally, a defoamer;

wherein the composition reduces volatile isovaleric acid by 72% or greater, and wherein the semi-volatile surfactant comprises hydrophilic groups that volatilize upon drying leaving a hydrophobic tail, thereby improving compatibility with a durable water repellent.

* * * * *